(12) United States Patent
McIntyre et al.

(10) Patent No.: US 6,587,839 B1
(45) Date of Patent: Jul. 1, 2003

(54) METHOD AND SYSTEM FOR NOTIFYING A CONSUMER THAT THE PHOTOFINISHING ORDER IS READY AND FOR CONTROLLING INVENTORY OF PHOTOFINISHING ORDERS IN A BUSINESS

(75) Inventors: Dale F. McIntyre, Honeoye, NY (US); Andrew T. Cooper, Fairport, NY (US); Robert F. Weir, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/498,535

(22) Filed: Feb. 4, 2000

(51) Int. Cl.⁷ .......................... G06F 17/60; G03D 17/00
(52) U.S. Cl. .......................................... 705/27; 396/564
(58) Field of Search ........................... 396/564; 705/26, 705/27, 28

(56) References Cited

U.S. PATENT DOCUMENTS

| | | | | |
|---|---|---|---|---|
| 4,239,384 A | | 12/1980 | Treiber | 355/68 |
| 4,651,199 A | | 3/1987 | Alkofer | |
| 5,760,917 A | * | 6/1998 | Sheridan | 358/442 |
| 5,799,219 A | | 8/1998 | Moghadam et al. | 396/319 |
| 6,017,157 A | * | 1/2000 | Garfinkle et al. | 396/429 |
| 6,203,217 B1 | * | 3/2001 | Glogovsky | 396/564 |
| 6,283,646 B1 | * | 9/2001 | Dellert et al. | 396/564 |
| 6,324,521 B1 | * | 11/2001 | Shiota et al. | 705/27 |
| 6,336,100 B1 | * | 1/2002 | Yamada | 705/26 |

FOREIGN PATENT DOCUMENTS

JP          10039392 A  *  2/1998  ........... G03B/17/18

OTHER PUBLICATIONS

Robertshaw, Nicky, "Two new locations give Wolf Camera mid–South edge", Jul. 14, 1997, Memphis Business Journal, vol. 19, No. 10, p. 3.*

"America Online Teams with Eastman Kodak to Bring Photos to E–Mail", Oct. 3, 1999, Patriot–News.*

Kim, Nancy, "FilmWorks is on a roll with test stores", Dec. 19, 1997, Puget Sound Business Journal, vol. 18, No. 32, p. 1.*

* cited by examiner

Primary Examiner—Kenneth R. Rice
Assistant Examiner—Bryan Jaketic
(74) Attorney, Agent, or Firm—Frank Pincelli

(57) ABSTRACT

A method of informing a customer that their photofinishing order is ready to picked up at a retailer. An electronic notification is sent to the customer when the order has been completed, the notification containing at least one image of the plurality of image in the customer order. A notice may also be sent to retail provider where the order is to picked-up by the customer. The method also includes the ability for the consumer to direct that the order be sent to a particular retail establishment.

9 Claims, 8 Drawing Sheets

METHOD AND SYSTEM FOR NOTIFYING A CONSUMER THAT THE PHOTOFINISHING ORDER IS READY AND FOR CONTROLLING INVENTORY OF PHOTOFINISHING ORDERS IN A BUSINESS

FIELD OF THE INVENTION

The present invention relates to a method and system for informing a customer that an order is ready. More particularly, it relates to a method and system for informing a customer that their photofinishing order is ready and providing additional information as to what is contained in the order.

BACKGROUND OF THE INVENTION

In a typical photofinishing operation, a customer drops off his/her film to be processed and printed at a site usually located in a photo specialty store or other retail location. In a traditional photofinishing operation, the customer must return at a later time to pick up the finished photographic prints. In recent years, on-line photofinishing services have emerged where a customer's film images, once processed, are electronically scanned and the resulting digital images stored. The customer may access these images remotely, for example from a home computer or kiosk, electronically mail the images to others, or order hard copy prints or other photographic goods or services all remotely.

In order to retrieve his/her pictures from a traditional photofinishing service, the customer must know when the order is complete and has been delivered to the retail location where the order was placed. Traditional photofinishing services often provide a promised delivery date, but sometimes this date is not met, resulting in an annoying unnecessary first trip and a second trip for pickup. Other than placing a phone call to check on the order, there is no solution to avoid this potential problem. In the hurly-burly of life today, a customer may even forget that a photofinishing order was placed.

In a more recent scenario, a consumer with a digital camera can upload pictures to a web site where they are printed and returned via a typical delivery service. This can cause a problem where weather in combination with roadside mailboxes leaves a delivered print order at risk. Additionally, the consumer must bear the cost of shipping the prints, which can be substantial, as photographic grade paper is much heavier per square inch than standard letter grade paper. To eliminate the concerns of security, weather, and shipping costs, a consumer may elect to pick up the prints at a convenient retailer thus raising the need for notification again. With regard to the retailer, customers who upload directly to an online photofinisher don't visit the retail store. Providing the customers with an option to pick up at the retailer of their choice offers value to the customer and provides the retailer with a customer they wouldn't normally attract for this transaction.

Several solutions to the problem of notification of a completed order have been provided recently for the case of on-line photofinishing services. For example, U.S. Pat. No. 5,799,219 by Moghadam, et. al, assigned to the Eastman Kodak Company, discloses a method of recording a customer's electronic address directly on a roll of film via a magnetic recording layer present on the film, for example such as that found in the Advanced Photographic System. Once the film has been processed and scanned, notification that the order is ready to be viewed can be automatically sent to the customer's electronic address. More recently, users of the internet service provider, "America On Line"™ (AOL) may simply check the appropriate box when submitting film for photofinishing and later receive the notification "You've Got Pictures" when they log in to their AOL account. However, neither of these solutions provide any information about the content of the particular order which has been completed, only that an order is available for viewing. If multiple rolls had been submitted, a customer might wish to know which roll had which content without having to open up each order.

In the co-pending, commonly-assigned U.S. patent application Ser. No. 09/213,517, entitled SYSTEM AND METHOD FOR COMMUNICATION OF DIGITAL IMAGES GENERATED FROM PHOTOGRAPHIC FILM, filed Dec. 17, 1998, by Joseph A. Manico, C. S. Willand, Madhav Mehra, and H. E. Bussey, there is disclosed a method where a roll of film or a single use camera is provided to the customer with a unique Universal Resource Locator (URL) code associated with it. This code can be used by the customer at a later time to access pictures electronically on a computer via the internet or from a public kiosk. This solution does not address the problem of notification of the customer when the order is ready to be accessed. At present the customer can only re-try the address at a later time until the order is received.

SUMMARY OF THE INVENTION

The foregoing and other objects, features and advantages of the invention will be apparent from the following more particular description of the preferred embodiment of the invention illustrated in the accompanying drawings.

In accordance with one aspect of the present invention there is provided a method for permitting a customer to pick up at a retailer a remotely placed photofinishing order, comprising the steps of:

a. a customer electronically placing a photofinishing order having at least one digital image to a remote photofinishing lab;

b. the customer selecting a retailer to which the completed photofinishing order is to be sent;

c. the photofinishing lab forwarding the completed photofinishing order to the selected retailer; and e. forwarding a notification to the customer that the photofinishing order was shipped to the retailer, said notification includes a visual display of at least one digital image of said photofinishing order.

In accordance with another aspect of the present invention there is provided a method for permitting a customer to pick up at a retailer a remotely placed photofinishing order, comprising the steps of:

a customer electronically placing a photofinishing order having at least one digital image to a remote photofinishing lab;

said customer selecting a retailer to which the completed photofinishing order is to be sent;

said photofinishing lab forwarding said completed photofinishing order to said selected retailer;

forwarding a notification to said customer that said photofinishing order was shipped to said retailer; and further comprising the step of said photofinishing lab obtaining compensation form said retailer based on the customer selecting said retailer for picking up f said photofinishing order.

In accordance with yet another aspect of the present invention there is provided a method for permitting a customer to pick up at a retailer a remotely placed photofinishing order, comprising the steps of:

a customer electronically placing a photofinishing order having at least one digital image to a remote photofinishing lab;

said customer selecting a retailer to which the completed photofinishing order is to be sent;

said photofinishing lab forwarding said completed photofinishing order to said selected retailer; and forwarding a notification to said customer that said photofinishing order was shipped to said retailer wherein said photofinishing order comprises a plurality of images, said notification comprises at least one digital image that is selected from said plurality of image in accordance with a predetermnined criteria.

BRIEF DESCRIPTION OF THE DRAWINGS

In the detailed description of the preferred embodiments of the invention presented below, reference is made to the accompanying drawings in which:

FIG. 3b is an elevational view of the back side of the post card of FIG. 3a;

DETAILED DESCRIPTION OF THE INVENTION

Figure 1:
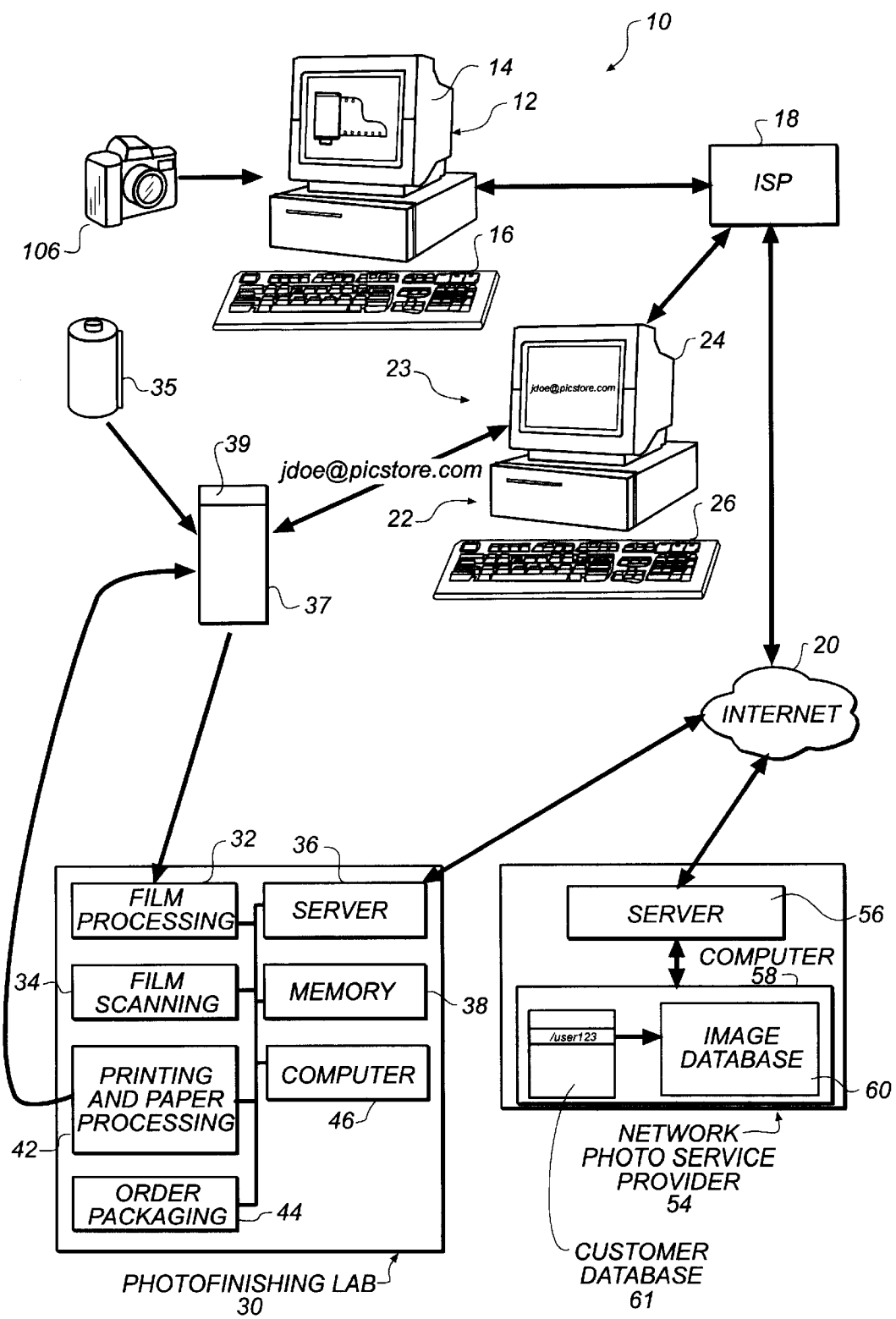
FIG. 1 is a schematic diagram of a system used in the practice of the present invention.

Referring to FIG. 1, there is illustrated a schematic diagram of a system 10 made in accordance with the present invention. The system 10 includes a personal computer 12 having a display device 14 and a keyboard 16 for entering data into computer 12. The display device 14 may be of any particular type. In the particular embodiment illustrated the display device is a CRT. Personal computer 12 is provided with appropriate communication hardware and software so as to enable the personal computer 12 to be connected to an internet service provider (ISP) 18. The ISP 18 is linked to the Internet 20.

The system 10 may also include a kiosk or other retail computer 22 located a retailer 23. The kiosk 22 will include a display device 24 and data entry means 26. In the particular embodiment illustrated, data entry means 26 is a keyboard. It is, of course, understood that the data entry means may be of any appropriate type device, for example, but not by limitation may be a touch display screen or a mouse for controlling a selection icon on the display device 24 or a magnetic card reader or bar-code reader.

The system 10 further includes a photofinishing lab 30 (photofinishing provider) which provides various photofinishing goods and services. For example, the photofinishing lab 30 typically will receive exposed unprocessed photographic film for processing and printing of photographic prints. The photofinishing lab 30 may also receive orders from an electronic camera 106 for the producing of prints or the producing of various other image storage products such as Picture CD and Picture Disk, which are computer storage memory devices having a plurality of customer images. The photofinishing lab 30 may also produce a variety of other image related products such as photo albums, t-shirts and mugs having personalized images thereon. There is virtually no limit as to the number and different type of image goods or services that may be provided by the photofinishing lab 30. A typical photofinishing lab 30 will include various different sections. In the particular embodiment illustrated the photofinishing lab 30 includes a film processing section 32 wherein exposed undeveloped film is processed. A film scanning section 34 is provided for scanning the processed film so as to obtain a digital record of the images thereon. The scanning section 34 includes a CCD or other scanning device for electronically capturing the images on the film. The images obtained from the film are forwarded to a computer server 36 or memory storage device 38. A computer 46 is also provided at the photofinishing lab 30 for controlling and monitoring of the photofinishing processes being conducted. The digitally captured images may be also sent on to a printer and processing section 42 where the images may be digitally or optically printed and developed. The completed order is then packaged at an/order packaging station 44 and returned to the retailer 23 that forwarded the order.

In the particular embodiment illustrated, the exposed photographic film is provided to photofinishing lab 30 in a cassette 35 which is placed into an order envelope 37 typically provided at a retailer 23. The order envelope 37 is appropriately filled out by the customer, submitted by the retailer 23, and forwarded by the retailer 23 to the photofinishing lab 30 for obtaining the appropriate service. A tear off strip 39 is taken off the order envelope 37 by the customer as a receipt for the order. The strip 39 includes a copy of the envelope ID provided on the envelope that is forwarded to the photofinishing lab 30

The system 10 further includes a network photo service provider 54 wherein digital images obtained from the scanner section 34 at a photofinishing lab 30 may be stored. In a similar fashion, the network photoservice provider 54 receives digital images obtained from an electronic camera 106 via personal computer 12 connected to ISP 18 and the Internet 20. It will be understood that an electronic camera can be a digital still camera or a digital video camera from which a single still image may be derived.

In the event that the order was created by a customer from the electronic camera 106, the completed order is returned directly to the customer who additionally must bear the cost of shipping the order. Typically, the customer provides a valid credit card number for the transaction to which the total order cost is charged. During the ordering process, the customer may choose to have the completed order shipped to a retailer 23 in exchange for not paying a shipping fee. The selection of a convenient participating retailer is commonly found on web sites who additionally have retail locations or partners and the software engaged is commonly referred to as a "locator". The typical implementation of "locator" software involves the use of a customer's zip code as an index into a database of participating retailers 23. The selection of the most convenient retailer 23 is communicated and stored in the memory 38 of the photofinishing lab 30 and utilized by the order packaging section 44 to route the order. In exchange for providing a customer to the retailer 23, the photofinishing lab 30 charges an optional fee to the retailer 23 which may or may not equate to the shipping fee. In lieu of a fee, other forms of compensation or value may be exchanged. For example, but not limited to, an agreement that the retailer would use the photofinisher for its photofinishing needs. Billing the retailer 23 is done by computer 46 as a function of the number of customers who choose the retail delivery option in a given month and the contractually agreed upon fee. The resultant bill may be sent by conventional mail delivery or electronically through server 36 and the Internet 20 to the retailer 23.

Continuing with the description of FIG. 1, the network photo service provider 54 includes a server 56 which is used to communicate with the Internet 20. The network photo service provider 54 is in electronic communication with the photofinishing lab 30. In the embodiment illustrated, the network photo service provider 54 is in communication with photofinishing lab 30 through Internet 20. This also allows communication between a customer at home with the retailer 23, photofinishing lab 30, and network photo service provider 54. A computer 58 is also provided at the network photo service provider 54. Computer 58 is in communication with server 56 and includes an image database 60 which stores digital images and a customer database 61 for identifying the digital images stored in the image database 60. In the system 10 illustrated, the network photo service provider 54 is shown separate from the photofinishing lab 30. However, the network photo service provider 54 and photofinishing lab 30 may be at a single operation at the same location. In such case, server 56 may be in direct communication with server 36 or may even be the same server.

Figure 4:
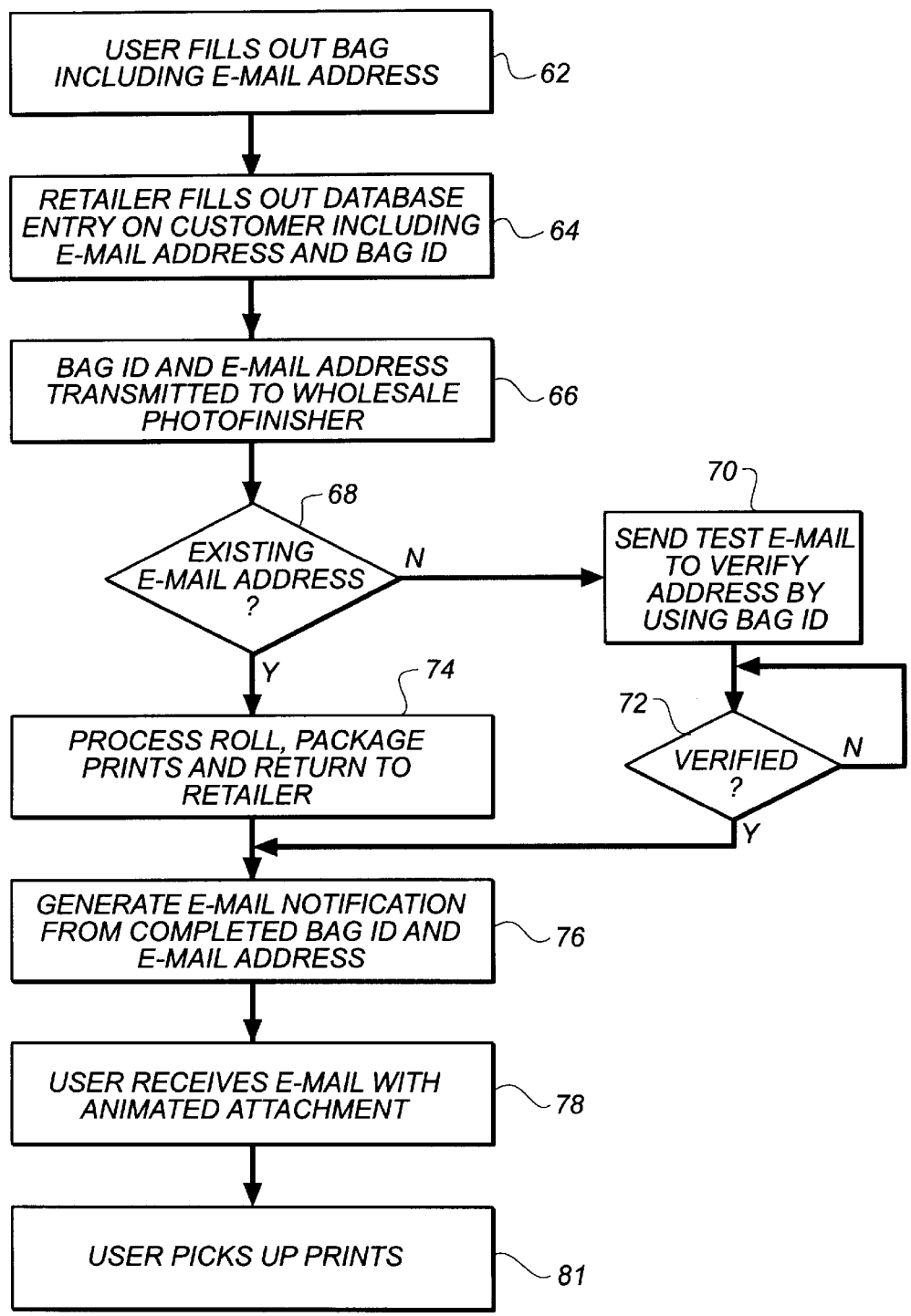
FIG. 4 is a flow chart of one form of the present invention.

Referring to FIG. 4, there is illustrated a process flow diagram for the system 10 of the present invention. The first step 62 occurs when a customer fills out an order envelope 37 for ordering a photofinishing service. The customer provides the appropriate information, for example, name, address and e-mail address. In a typical order, the customer would place the item to be processed within the order envelope 37. In the embodiment illustrated this is a roll of photographic film contained in a film cartridge 35. However, the present invention is not so limited. As previously discussed the customer may be ordering or placing within the order envelope 37 other items that can be used for obtaining a variety of goods or services. An optional step 64 is provided where the retailer may enter appropriate information at retail computer 22 with respect to the order dropped off by the customer and send this information to the network photo service provider 54 via the internet 20. This retailer may request that the retailer also receive notification when the order is completed. The order envelope 37 is forwarded on to the photofinishing lab 30 at step 66 wherein the order is processed. The photofinishing lab 30 enters the appropriate information regarding the order received into computer 40, for example, name, address, e-mail address, etc. Appropriate information is then sent from the photofinishing lab 30 to the network photo service provider 54 such as the customer identification data. The network photo service provider 54 takes the information received from the photofinishing lab 30 and stores the digital images in the image database 60 and customer information in the customer database 61. The network photo service provider 54 at step 68 determines if there is an existing e-mail address on file for that particular customer. If the answer is no, a test e-mail at step 70 is sent to the customer by using the e-mail address that was provided on the order envelope 37 and entered into the computers 46 and 58. At step 72, the e-mail address is verified. The photofinishing process continues and is independent of what the network photo service provider 54 does. If the e-mail address for the customer is not verified, special attention may be needed obtain and/or verify an e-mail address for that customer. If no e-mail address is or can be obtained the process proceeds as discussed in FIG. 5. As illustrated by step 74, the customer order is processed. In the embodiment illustrated this would result in the film being processed by film processing section 32 and scanned at scanning section 34 so as to obtain a digital record of the images. At step 76, an e-mail notification is generated, as discussed later herein, in preparation for forwarding to the customer. The e-mail notification will include at least one of the images that have been processed in the order. The e-mail notification at step 76 is forwarded to the customer via ISP 18 and Internet 20 from the network photo service provider 54, and the customer receives the notification. The notification may also indicate a message that the order has been sent to the retailer 23 that the customer had dropped off the film with. A notification may also be sent to the retailer 23 to which the order was delivered. Alternatively, if the customer does not have a the customer may use the retail computer 22 at the retailer 23 for submitting information and for receiving notification. The retailer 23 may also send an e-mail notice to the customer stating that the order has been received and is ready to be picked up. The retailer 23 may also send an e-mail confirmation notice to the network photo service provider 54 that the order has been received.

At step 78, the customer receives the e-mail. The e-mail includes a visual display or an attachment which includes a visual display illustrating at least one of the images in the completed order. The notification may include other information that may have been provided by the customer or that may have been provided by the retailer, photofinishing lab 30 or network photo service provider 54. At step 81, the customer picks up the order at the retailer 23 where the order was originally dropped off.

Figure 2A:
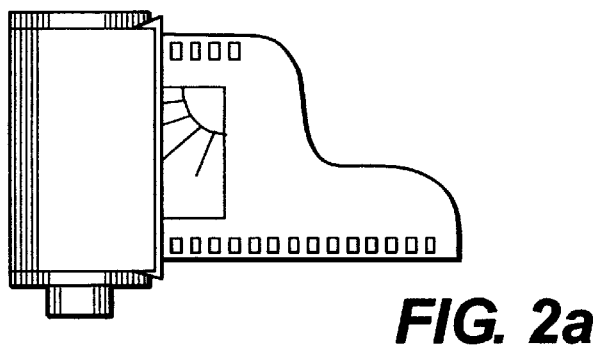
FIGS. 2a–2d illustrate a sequence of images displayed on a personal computer display device of FIG. 1 in accordance with the present invention.
Figure 2B:
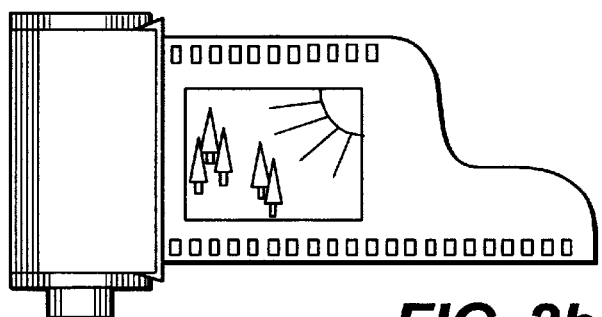
Figure 2C:
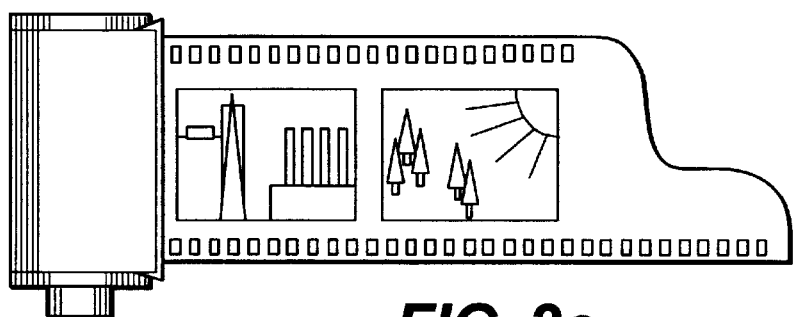
Figure 2D:
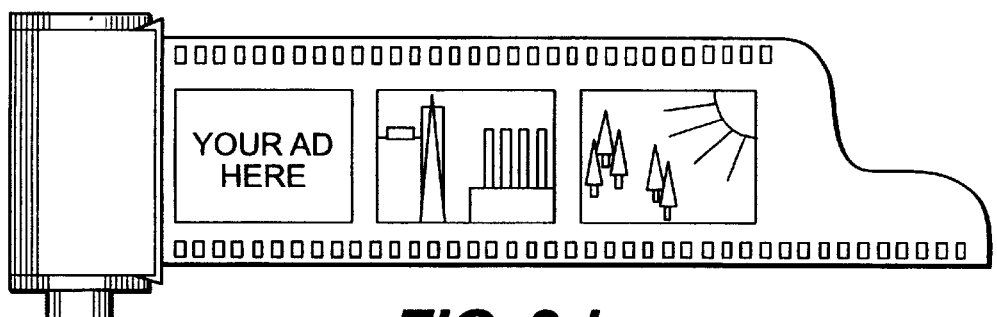

Referring to FIGS. 2a–2d there is illustrated one manner in which the visual display may be presented. In particular, FIGS. 2a–2d show an animated visual presentation that may be provided. FIGS. 2a–2d illustrate a series of successive visual screen displays for display device 24 that are repeatedly displayed as a part of the notification. An animated GIF file is an example of a file format that can be attached to an e-mail notice and contain a sequence of visual screen displays that repeat at a programmed rate. The visual display is designed to assist the consumer to identify the particular order that has been completed. For example as illustrated in FIG. 2a, there could be shown an initial view of a film cartridge with a portion of the film being visually displayed. In FIG. 2b, there is illustrated a first image which has been processed that was contained on the roll of film contained within the film cartridge 35 in the photofinishing order. FIG. 2c illustrates a second image that would be displayed after FIG. 2b. In addition as shown in FIG. 2d, there is illustrated the addition of an advertisement for the photofinishing lab 30, retailer 23 or network photo service provider 54. Alternatively, the advertisement can be directed at any product or service which may or may not relate to the images. While in the particular embodiment described, only two images are shown in FIG. 2b, any number of images could be displayed to help the customer identify the order that has been completed. Additionally, if more than one order has been completed for the customer, the notification for the orders may be shown as a single e-mail message or as separate e-mail messages. If more than one order is displayed in a single notification, an equal number of cartridges may be illustrated each illustrating at least one image from that order. After FIG. 2d is illustrated the sequence of FIGS. 2a–2d is repeated at a predetermined selected rate. Depending upon the rate at which the screens are changed, an animated/motion display will be provided. It is of course understood that various other visual screens may be illustrated for showing the images that have been processed.

Figure 3A:
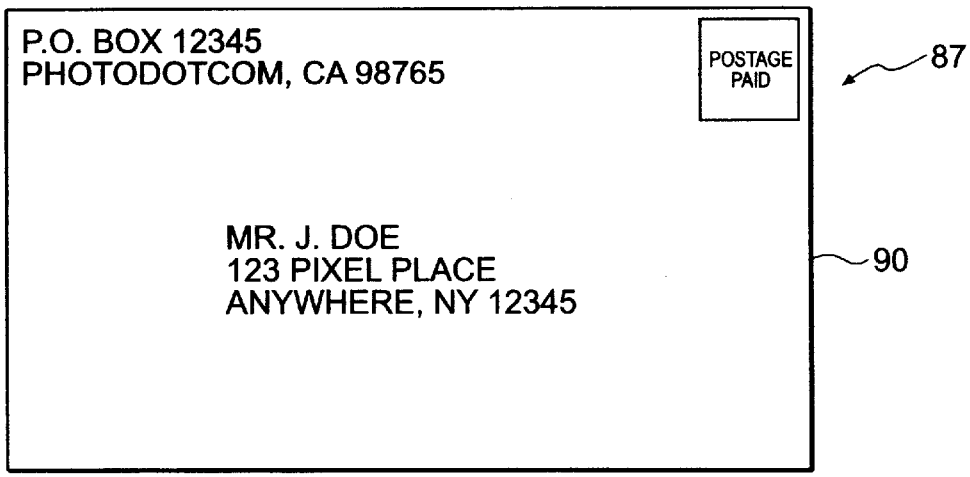
FIG. 3a is a front elevational view of the front side of a post card made in accordance with the present invention.
Figure 3B:
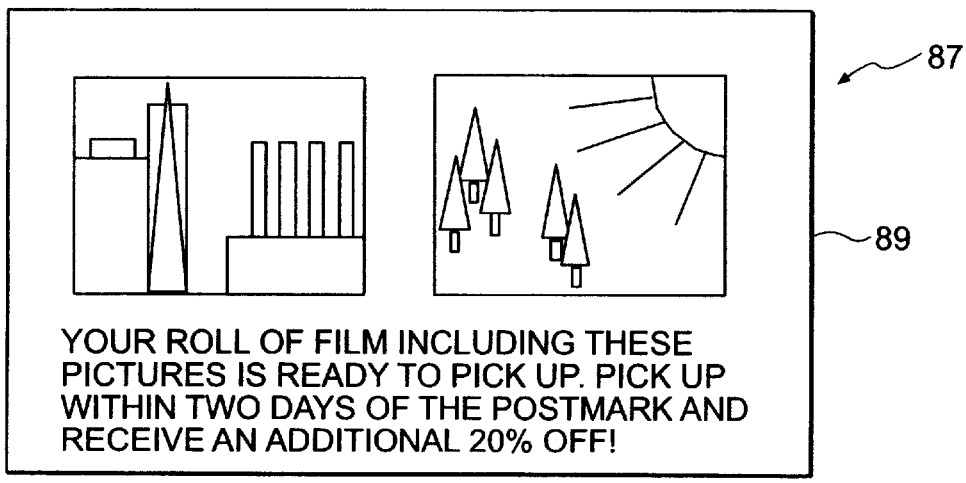
Figure 5:
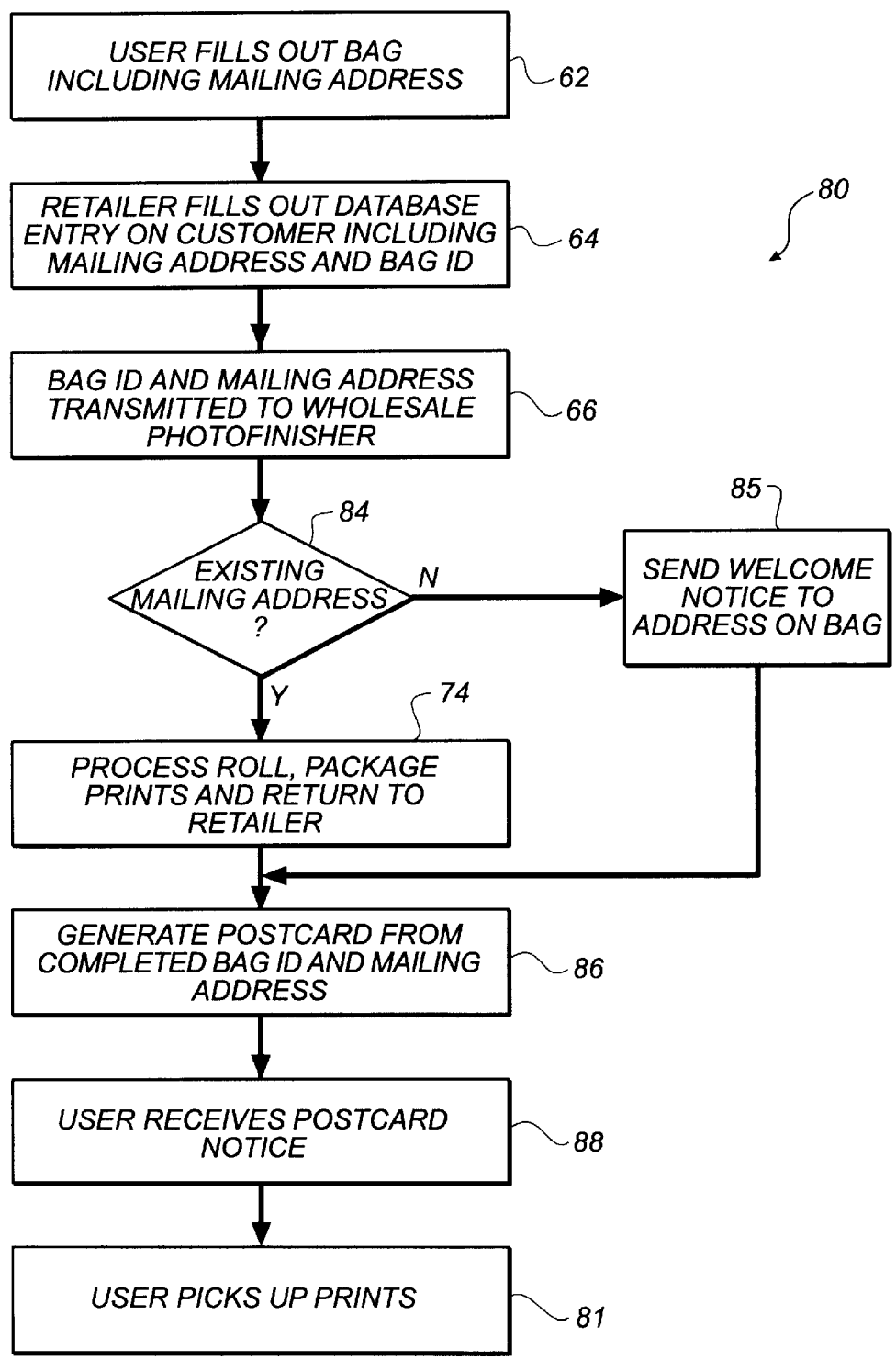
FIG. 5 is a flow chart of another form of the present invention.

Referring to FIG. 5 there is illustrated a modified photofinishing system 80 made according to the present invention. The system 80 of FIG. 5 is similar to system 10 of FIG. 4 like numerals indicating like steps and operations. In system 80 no e-mail address is available for the customer. There is only a mailing address associated with the customer. Thus, at step 84 after the bag 37 is forwarded to the photofinishing lab 30. The photofinishing lab 30 or network photo service provider 54 determines if there is an existing mailing address, if yes, a postcard can be sent via the address on the order envelope 37 welcoming the customer to their product identification system if now mailing address exists for the customer at step 84, at step 85 a welcome notice is prepared and sent to the address on the order bag. At the next step 74, the order is completed. Once the order is completed, at step 86, a postcard 87 using the address obtained from the order envelope 37 is generated and forwarded to the customer. The post card 87 is illustrated by FIG. 3a and 3b. As illustrated by FIG. 3a, the address of the customer is provided on the front side 90 of postcard 87 along with the return address of the photofinishing lab 30 in the event the postcard 87 is undeliverable. This provides information that the address is incorrect. FIG. 3b illustrates the backside 89 of postcard 87 of FIG. 3a. The backside 89 is provided with at least one image of the order that has been completed by the photofinishing lab 30. In the particular embodiment illustrated, two images are provided. The postcard 87 would include a notice that the order has been completed and is ready to be picked up within two days of the postmark or other time frame.

In either of the systems 10, 80, the notification may also include an incentive to encourage the customer to pick up the order as soon possible. In one form, a discount may be provided. For example, a 20% discount may be offered if the order is picked up within a particular time period. This is very beneficial to the retailer 23 in that this minimizes the chance that the customers may leave the order at the retailer 23 for an extended period of time or even forget that the order has been returned. It is, of course, understood that any appropriate incentive may be provided as desired. In using the postcard 87, a coupon with an expiration date may be provided directly on the postcard 87.

Various modifications may be made in accordance with the present invention. Referring to FIGS. 7a–7d, a series of illustrations of successive visual notification screen displays for display device 24 are shown which are repeatedly displayed as a part of the notification in a manner consistent to FIGS. 2a–2d. In this particular embodiment, the photofinishing order is comprised of images uploaded from an electronic camera 106 using the computer 12 of FIG. 1. In particular, electronic camera 106 uploads digital images that have been captured. The computer 12 would used to forward the images electronically, for example, over the Internet 20, to the photofinishing lab 30 and for placement of a photofinishing order. Appropriate order placement screens (not shown) would be displayed to the customer for selection of the desired goods and/or services. This would also include the ability for the customer to select from a list provided a retailer 23 to which the completed photofinishing order is to be sent for pickup. This could result in a saving to the customer by avoiding the cost of shipping the order directly to the customer by mail or other conveyance. This cost saving may be passed on the customer. The selected retailer 23 will get a customer into his establishment that would not have visited the establishment. Thus, it would be appropriate that the photofinishing lab 30 charges a fee to the receiving retailer 23, or receive some other type of compensation. The compensation may be based on the number of such orders that are sent to the retailer 23 based on the customer selection or based on maintaining the retailer 23 on the approved list of retailers 23 shown to the customer.

Figure 7A:
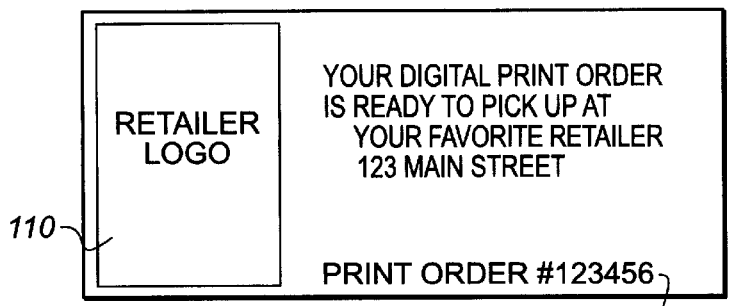
FIGS. 7a–7e illustrate a sequence of images displayed on the personal computer display device of FIG. 1 in accordance with an alternative embodiment of the present invention.
Figure 7B:
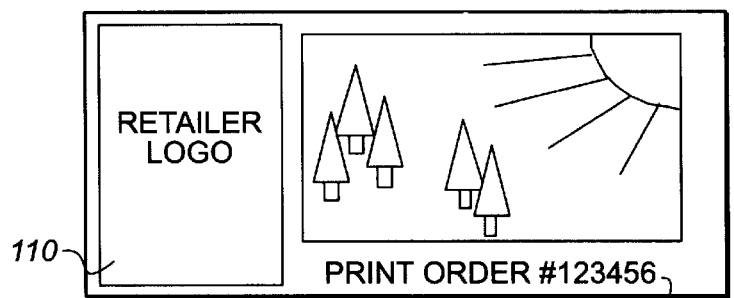
Figure 7C:
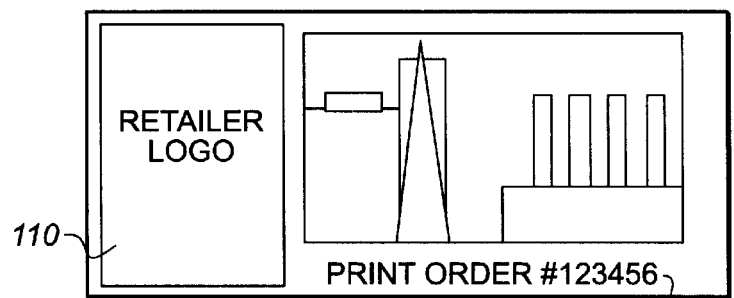
Figure 7D:
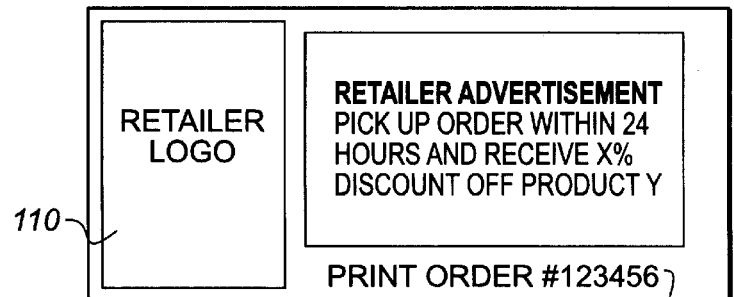
Figure 7E:
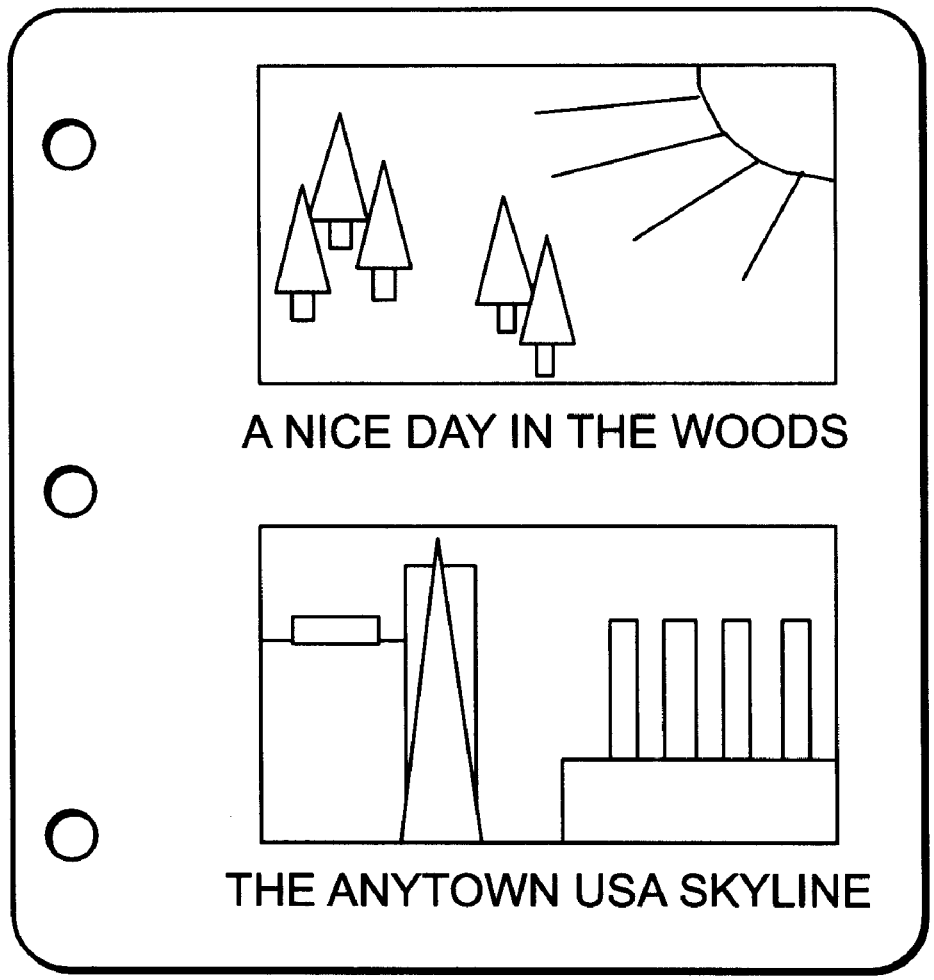

Given that the photofinishing order is placed remotely, the visual displays contain an order identification code 108 to assist the customer in retrieving their order at the retailer 23. The visual displays also contain a retailer branding area 110 available for the retailer 23 to insert a mark, logo, or advertisement. With remote ordering, the opportunity for a retail clerk to create awareness or even up sell a customer to a new product is not available. It is therefore desirable to visually display a customer's photos within a new product offering such as the album page shown in FIG. 7e. It will be understood that the visual display of FIG. 7e may be the last successive visual notification screen display element of the succession of the visual notification displays of FIGS. 7a–7d or it may be provided as a separate visual notification screen display. The customer may not have been aware of that particular product and the visual display also includes an active button 112 which causes computer 12 to display an album page order fulfillment page (not shown) for the purposes of immediately ordering an album page of the images within the photofinishing order. Similar up sells may be advertised on the postcard 87. For example, a notice that albuming of the images of the order can be obtained and if ordered within a week of receiving the images, a 30% discount will be provided to the customer. It is, of course, understood that various other promotions may be provided to the customer. It may be desirable to provide promotional material related to the goods or services being provided. For example if a customer requests an enlargement, an ad for custom framing may be provided in the notification.

In the embodiments discussed above hard copy photographic prints are returned to the customer. The present invention is not so limited. In a modified form, there may an option for the consumer in the notification to receive a download of high resolution images to the customer's computer 12 so that the customer may print images at his or her home. A service fee (charge) could be associated with the downloading of the images directly to the customer.

Figure 6:
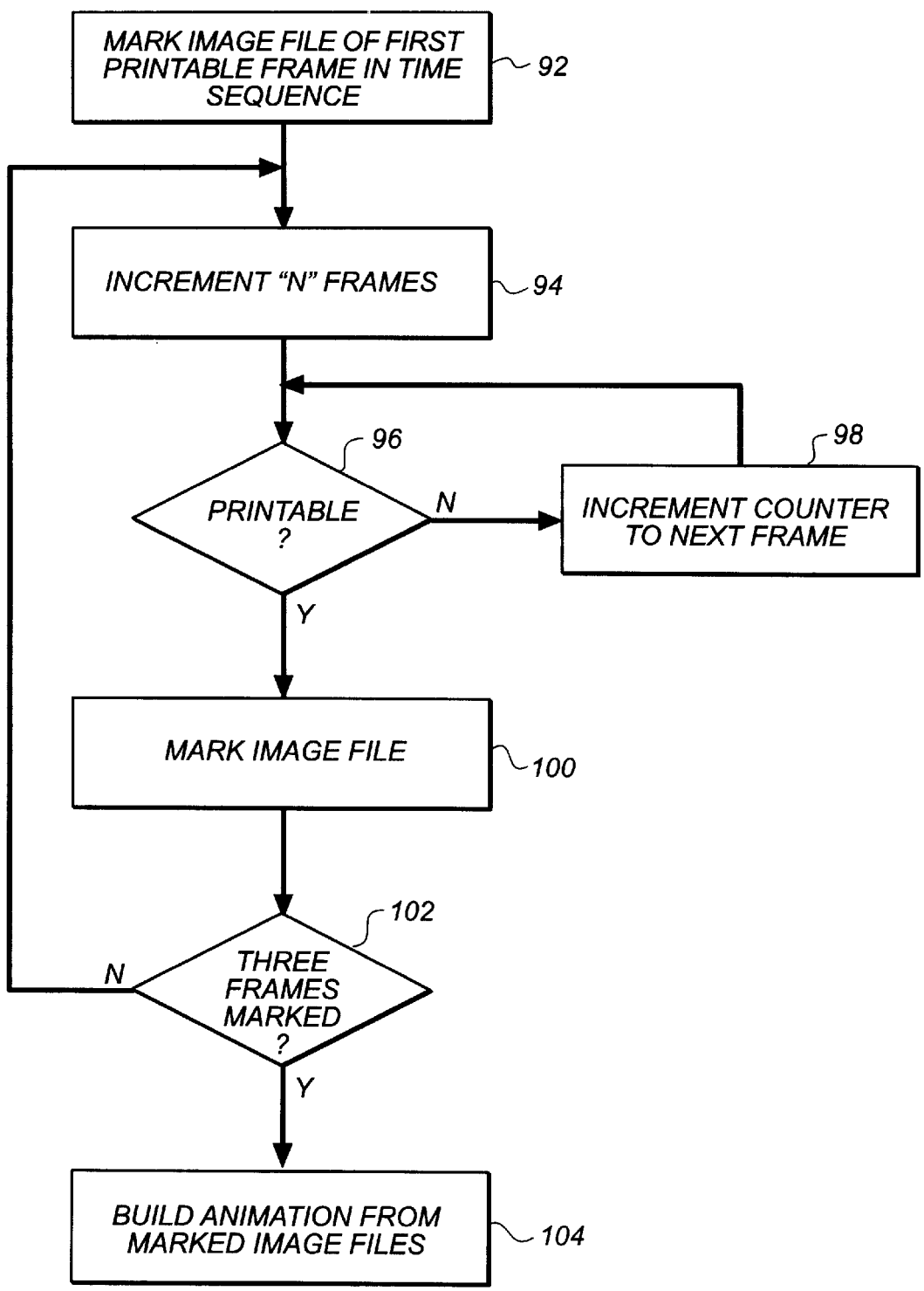
FIG. 6 is a flow chart of the decision process used in selecting of appropriate images to be forwarded to the customer.

An important part of the present invention is that the images that are to be in displayed in the notification to the customer are of an appropriate quality. Referring to FIG. 6, there is illustrated a decision process used in deciding which images are to be submitted to the customer for use in identifying the customer's order. In the preferred embodiment, the steps are performed by software in a computer program. Beginning at step 92, the images that have scanned are reviewed as to which is the first printable frame. For example, but not by way of limitation, images are analyzed to determined if sufficient light is present in the image. It is to be understood the images can analyzed for any desired criteria. Then the next "n" incremental frame is reviewed to see if that image is printable at step 94. By incrementing by "n" frames, for example five or six, is quite likely that selected images may be of a different individual, event, location, etc. If the next incremental image is printable, at step 96, the image is marked. If it is not, at step 98, the next incremental "n" image is reviewed to determine if that image is printable. This process is continued until the next printable image is found and that image is marked at step 100. At step 102, the selection process is stopped upon reaching a predetermined number of marked frames for display. In the particular embodiment illustrated in FIG. 6, three frames are marked. Therefore, when three identifiable printable images are determined the animation e-mail and/or postcard 87 is produced at step 104.

Alternatively, the image to be displayed may be selected by dividing the order into segments. For example, the order may be divided into two or more segments, preferably at least three segments. If the image order is divided into three segments, they would be identified as the first third, the middle third, and the last third. One image from each segment would be selected. Currently there is available in the marketplace APS film which includes a magnetic layer upon which the camera may record information such as the date, place, event, etc. Such information relating to the picture is commonly referred to as metadata. One form of segmenting the order can be based on grouping pictures by proximate dates retrieved from the APS filmstrip. Segments can be determined when picture groups are separated by a day or several days.

Additional information that has been obtained from the customer order may also be displayed with the notification. If metadata was read from the APS film, this could be displayed. This metadata could be displayed in the notification to assist the user in identifying the images in the order. The metadata may also obtained in another manner, for example, but not by way of limitation, the information may have been provided in the original order, such as writing on the order envelope.

In determining that an image is suitable for printing or display, various appropriate algorithms may be used. For example, U.S. Pat. No. 4,239,384 by H. Treiber, published Dec. 16, 1980 and herein incorporated by reference, discloses a method useful in a scanning printer to automatically detect and reject from printing frames unprintable by virtue of under- or over-exposure. Also, commonly assigned U.S. Pat. No. 4,651,199 by J. Alkofer discloses a method to detect and reject from printing blank frames, either of the "no exposure" or "maximum exposure" type. Both of these patents are hereby incorporated by reference. Additionally, appropriate algorithms may be provided for adjusting the image so that the images forwarded to the customer are illustrated in their best possible form.

It is to be understood that various other changes and modifications may be made without departing from the present scope of the invention. The present invention being limited by the following claims.

PARTS LIST 10 system
12 personal computer
14 display device
16 keyboard
18 internet service provider
20 internet
22 Kiosk/retail computer
23 retailer
24 display device
26 data entry means
30 photofinisher lab
32 film processing section
34 film scanning section
35 film cartridge/cassette
36 computer server
37 order envelope/bag
38 memory
39 tear-off strip
40 computer
42 processing section
44 order packaging station
46 computer
48 computer
54 network photo service provider
56 server
58 internal computer
60 image database
61 customer database
62 step
66 step
68 step
70 step
72 step
74 step
76 step
78 step
80 system
81 step
84 step
85 step
86 step
87 postcard
88 step
89 backside of postcard
90 front side of postcard
92 step
94 step
96 step
98 step
100 step
102 step
104 step
106 electronic camera
108 order identification code
110 retail branding area
112 active button

What is claimed is:

1. A method for permitting a customer to pick up at a retailer a remotely placed photofinishing order, comprising the steps of:
   a customer electronically placing a photofinishing order having at least one digital image to a remote photofinishing lab;
   said customer selecting a retailer to which the completed photofinishing order is to be sent;
   said photofinishing lab forwarding said completed photofinishing order to said selected retailer; and
   forwarding a notification to said customer that said photofinishing order was shipped to said retailer, said notification includes a visual display of at least one digital image of said photofinishing order.

2. The method of claim 1 further comprising the step of said photofinishing lab obtaining compensation from said retailer based on the customer selecting said retailer for picking up of said photofinishing order.

3. A method according to claim 1 wherein said photofinishing order comprises a plurality of images, said notification comprises at least one digital image that is selected from said plurality of images in accordance with a predetermined criteria.

4. A method according to claim 3 wherein said predetermined criteria comprises reviewing said plurality of images and dividing them into segments and selecting at least one image from at least two different segments.

5. A method according to claim 3 wherein said predetermined criteria comprises selecting at least two digital images from at least two different sections of said photofinishing order.

6. A method according to claim 3 wherein said at least one digital image comprises of three digital images, one selected from a first section, one from a middle section and one from an end section of said photofinishing order.

7. A method according to claim 1 wherein said photofinishing order comprises the producing prints of said at least one digital image.

8. A method for permitting a customer to pick up at a retailer a remotely placed photofinishing order, comprising the steps of:

a customer electronically placing a photofinishing order having at least one digital image to a remote photofinishing lab;

said customer selecting a retailer to which the completed photofinishing order is to be sent;

said photofinishing lab forwarding said completed photofinishing order to said selected retailer;

forwarding a notification to said customer that said photofinishing order was shipped to said retailer; and further comprising the step of said photofinishing lab obtaining compensation form said retailer based on the customer selecting said retailer for picking up said photofinishing order.

9. A method for permitting a customer to pick up at a retailer a remotely placed photofinishing order, comprising the steps of:

a customer electronically placing a photofinishing order having at least one digital image to a remote photofinishing lab;

said customer selecting a retailer to which the completed photofinishing order is to be sent;

said photofinishing lab forwarding said completed photofinishing order to said selected retailer; and forwarding a notification to said customer that said photofinishing order was shipped to said retailer wherein said photofinishing order comprises a plurality of images, said notification comprises at least one digital image that is selected from a plurality of images in accordance with a predetermined criteria.

* * * * *